(12) United States Patent
Cochran et al.

(10) Patent No.: US 7,603,528 B2
(45) Date of Patent: Oct. 13, 2009

(54) MEMORY DEVICE VERIFICATION OF MULTIPLE WRITE OPERATIONS

(75) Inventors: William Hugh Cochran, Rochester, MN (US); William Paul Hovis, Rochester, MN (US); Paul Rudrud, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 10/961,745

(22) Filed: Oct. 8, 2004

(65) Prior Publication Data

US 2006/0090112 A1 Apr. 27, 2006

(51) Int. Cl.
   *G01R 31/28* (2006.01)
   *G06F 11/00* (2006.01)
(52) U.S. Cl. .................. 711/162; 711/159; 714/737
(58) Field of Classification Search .............. 711/159, 711/162
   See application file for complete search history.

(56) References Cited

U.S. PATENT DOCUMENTS

| | | | | |
|---|---|---|---|---|
| 4,827,115 A | * | 5/1989 | Uchida et al. ............... | 235/492 |
| 5,023,776 A | * | 6/1991 | Gregor ........................ | 711/122 |
| 5,193,154 A | * | 3/1993 | Kitajima et al. ............. | 707/204 |
| 6,032,226 A | * | 2/2000 | Arimilli et al. .............. | 711/118 |
| 6,317,755 B1 | * | 11/2001 | Rakers et al. ................ | 707/204 |
| 6,735,670 B1 | * | 5/2004 | Bronstein et al. ........... | 711/108 |
| 6,792,506 B2 | * | 9/2004 | Solomon et al. ............ | 711/114 |
| 2003/0142429 A1 | * | 7/2003 | Ataku et al. .................. | 360/51 |
| 2003/0163763 A1 | * | 8/2003 | DeLano ....................... | 714/15 |

* cited by examiner

*Primary Examiner*—Brian R Peugh
*Assistant Examiner*—Victor W Wang
(74) *Attorney, Agent, or Firm*—Wood Herron & Evans LLP (57) ABSTRACT

Verification operations are utilized to effectively verify multiple associated write operations. A verification operation may be initiated after the issuance of a plurality of write operations that initiate the storage of data to a memory storage device, and may be configured to verify only a subset of the data written to the memory storage device by the plurality of write operations. As a result, verification operations are not required to be performed after each write operation, and consequently, the number of verification operations, and thus the processing and communication bandwidth consumed thereby, can be substantially reduced.

13 Claims, 5 Drawing Sheets

MEMORY DEVICE VERIFICATION OF MULTIPLE WRITE OPERATIONS

FIELD OF THE INVENTION

The invention relates to computers and data processing systems, and in particular to performing verifying write operations processed by memory devices utilized in such computers and data processing systems.

BACKGROUND OF THE INVENTION

Ensuring the integrity of data processed by a data processing system such as a computer or like electronic device is critical for the reliable operation of such a system. Data integrity is of particular concern, for example, in fault tolerant applications such as servers, databases, scientific computers, and the like, where any errors whatsoever could jeopardize the accuracy of complex operations and/or cause system crashes that affect large numbers of users.

Data integrity issues are a concern, for example, for many solid state memory arrays such as those used as the main working storage repository for a data processing system. Solid state memory arrays are typically implemented using multiple integrated circuit memory devices such as static or dynamic random access memory (SRAM or DRAM) devices, and are controlled via memory controllers typically disposed on separate integrated circuit devices and coupled thereto via a memory bus. Solid state memory arrays may also be used in embedded applications, e.g., as cache memories or buffers on logic circuitry such as a processor chip.

A significant amount of effort has been directed toward detecting and correcting errors in memory devices during power up of a data processing system, as well as during the normal operation of such a system. It is desirable, for example, to enable a data processing system to, whenever possible, detect and correct any errors automatically, without requiring a system administrator or other user to manually perform any repairs. It is also desirable for any such corrections to be performed in such a fashion that the system remains up and running. Often such characteristics are expensive and only available on complex, high performance data processing systems. Furthermore, in many instances, many types of errors go beyond the ability of a conventional system to do anything other than "crash" and require a physical repair before normal device operation can be restored.

Conventional error detection and correction mechanisms for solid state memory devices typically rely on parity bits or checksums to detect inconsistencies in data as it is retrieved from memory. Furthermore, through the use of Error Correcting Codes (ECC's) or other correction algorithms, it is possible to correct some errors, e.g., single-bit errors up to single-device errors, and recreate the proper data.

In addition, some conventional correction mechanisms for solid state arrays may be capable of disabling defective devices or utilizing redundant capacity within a memory system to isolate errors and permit continued operation of a data processing system. For example, steering may be used to effectively swap out a defective memory device with a spare memory device.

Despite the advances made in terms of error detection and correction, however, one significant limitation of the aforementioned techniques is that such techniques are not configured to directly verify, immediately after a store or write operation, whether correct data is stored in a memory device as a result of that operation. Put another way, conventional techniques have typically relied upon error correction and detection mechanisms that operate in connection with retrieval of data from a memory storage device, rather than in connection with the storage of data in the device.

Verification of write or store operations, which is referred to hereinafter as write verification, has conventionally been performed via a brute force method: issuing a read or fetch operation immediately after each write or store operation, and comparing the retrieved data to the data intended to be written to the memory storage device by the write or store operation. By doing so, however, each write or store operation effectively requires two operations to be issued and processed by the memory architecture, and thus can have a significant adverse impact on performance, in terms of both processing and communication bandwidth in a system.

One solution that may be utilized to potentially reduce the adverse impact of write verification is to perform what is referred to as "memory scrubbing" where a background process periodically reads each location in a memory array and utilizes ECC circuitry to detect and (if possible) correct any errors in the array. The background process may be configured to issue read operations only during periods of inactivity such that the impact on memory bandwidth is minimized. However, memory scrubbing still requires a read operation to be directed to each location in a memory array, and furthermore, may have limited verification capability when a system is under a constant, heavy workload, and thus has few (if any) periods of inactivity. Furthermore, memory scrubbing cannot, by itself, verify that a write operation was completed successfully or that a write operation was directed to the intended location, e.g., due to the possibility of interface errors or address/command integrity errors.

Therefore, a significant need continues to exist in the art for a manner of performing write verification of a solid state memory array with reduced impact on system performance.

SUMMARY OF THE INVENTION

The invention addresses these and other problems associated with the prior art by utilizing individual verification operations that are effectively capable of verifying multiple associated write operations. In particular, a verification operation consistent with the invention may be initiated after the issuance of a plurality of write operations that initiate the storage of data to a memory storage device, and may be configured to verify only a subset of the data written to the memory storage device by the plurality of write operations. As a result, verification operations are not required to be performed after each write operation, and consequently, the number of verification operations, and thus the processing and communication bandwidth consumed thereby, can be substantially reduced.

Moreover, in some embodiments consistent with the invention, the verification of only a subset of the data written to a memory storage device by a plurality of write operations may be coupled with the temporary queuing or preserving of data associated with the write operations issued prior to the verification operation in a data structure such as a queue or register, such that the preserved data can be used by an error recovery operation initiated upon detection of an incorrect storage of data by a verification operation. In contrast, when a verification operation fails to detect any incorrect storage of data, the temporarily preserved data may simply be discarded.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed and illustrated hereinafter utilize verification operations that are configured to verify only a subset of data written to a memory storage device by a plurality of preceding write operations, thus reducing the overhead associated with write verification that would otherwise be required were each write operation individually verified. In this context, a write operation may alternatively be referred to as a store operation, or simply a "write" or "store".

In many embodiments consistent with the invention, verification operations are configured to operate on a basic principle of verifying a fraction or subset of the data that gets written to a memory device, a collection of memory devices, a memory array, or other subset of a physical memory space, but queue up all of the data written thereto between these more infrequent verification operations. As will become more apparent below, write verification may be performed at different levels of a memory hierarchy, e.g., at a component level, a system level, a device level, or a subsystem level. Furthermore, logic utilized to perform such verification can be resident to different extents in a number of components in a memory architecture, e.g., in memory controller logic, memory device logic, and/or any intermediate logic therebetween.

As will also become more apparent below, the manner in which a subset of the data associated with a plurality of write operations is verified can vary in different embodiments. In one embodiment, for example, a system-level algorithm may be used to issue verification operations after N write or store operations, where N is typically based upon the size of a memory controller queue or a read verify array. As each write or store operation is issued, it is stored in an array on the memory controller or in another component in the memory architecture, e.g., a repower, redrive and/or buffer device coupled intermediate a memory controller and a memory storage device. In addition, a verify threshold value may be incremented. When the Nth store occurs, a verification operation taking the form of a read operation may be issued to read back the last store, which is then compared with the original data from the last write operation. If the compare is valid, the last N stores may then be cast out of the array and a verify threshold may be reset to 0. If the compare is invalid, the system may be notified that one of the last N stores was invalid. Since the last N stores were retained in an on-chip array, the store data may then be fetched from this array while the system goes into an error recovery mode to determine where the error occurred. Of note, this approach may be performed on different subsystems of a memory, e.g., on a per controller basis, or on a memory block basis (e.g. per physical rank of memory), as the last write to a physical chunk of memory indicates that it is working. It will be appreciated that as a memory block basis approach doesn't look at memory as a single large array, such an approach may allow for a higher probability of detecting specific address interconnect failures in a memory architecture.

As another alternative, a component-level algorithm may be used, whereby each memory storage device or array (e.g., a DRAM or an embedded memory array) is configured to store N stores and the associated locations in an on-chip queue or array. Similar to a system-based approach, a verification operation may be performed on the Nth store, which logic embedded in the component used to perform the operation.

The subset of data that is verified by a verification operation may vary in different embodiments. For example, as noted above, only the last of a series of N stores may be verified. As another alternative, the data and/or address information for N stores may be hashed, whereby only 1/Nth (or another subset) of data and/or address information for each store is verified. As another alternative only an exclusive-OR (XOR) address may be stored (where each store address is XOR'ed with the previous store XOR address) and the data or hashed data for each write operation saved. The data may also be XOR'ed from store to store in some embodiments. Furthermore, mathematical operations other than XOR operations may be used to accumulate data from multiple stores.

In some embodiments, a verify command (e.g., with a unique encode) may be issued by a memory controller to send an XOR address or hashed address and XOR data (or hashed data) to permit a memory device to compare what is sent vs. what is calculated or stored. In such an embodiment, if recovery is desired, it would also be desirable to store any write addresses in the memory controller as well. Furthermore, in such an embodiment, all data may be recovered from a queue on the memory device, with addresses recovered from the memory controller, or if architected, from memory devices that were known to have not failed. In some embodiments, memory devices with errors may signal errors using various mechanisms, e.g., a unique status pin or by putting out a predetermined response on the data strobe lines (or data lines).

In different embodiments, various information about a write or store operation may be temporarily queued consistent with the invention. For example, it may be desirable in some embodiments to only queue the data intended to be written as a result of a write operation, while in other embodiments, it may be desirable to queue, in addition to, or in lieu of the data intended to be written, address or other location-identification information and/or command/control data associated with a write operation. In other embodiments, e.g., where verification registers or entry queues are used, it may be desirable to queue different subsets of information from different write operations and/or combine the information from multiple write operations according to a particular algorithm (e.g., an XOR algorithm).

Other variations will be appreciated by one of ordinary skill in the art having the benefit of the instant disclosure.

Figure 1:
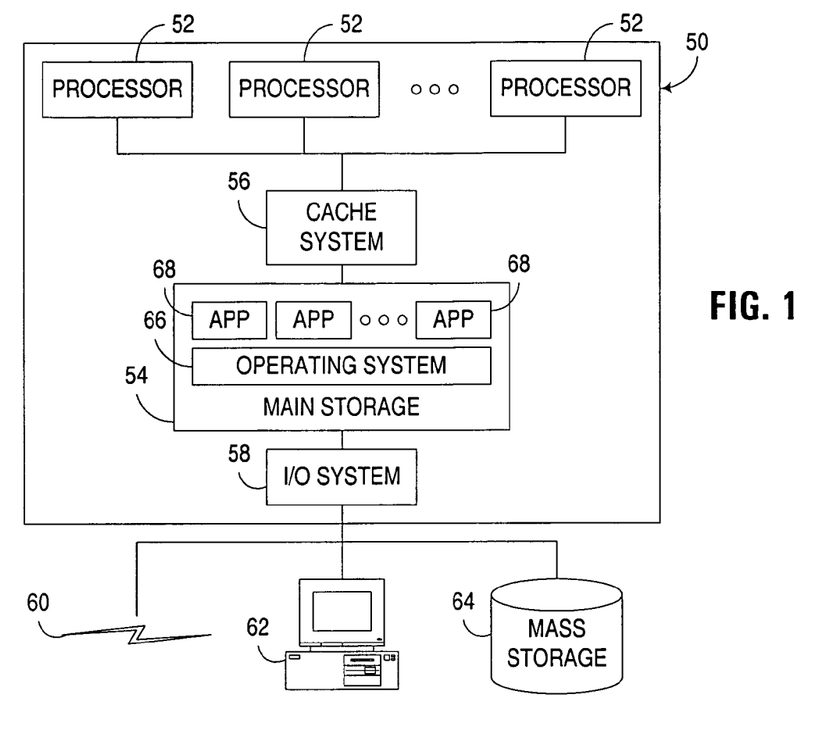
FIG. 1 is a block diagram of an exemplary apparatus with a memory architecture supporting a write verification consistent with the invention.

Turning to the Drawings, wherein like numbers denote like parts throughout the several views, FIG. 1 illustrates a computer 50 that represents one suitable environment within which the herein-described verification operations may be implemented in a manner consistent with the invention. Computer 50 generically represents, for example, any of a number of multi-user computers such as a network server, a midrange computer, a mainframe computer, etc. However, it should be appreciated that the invention may be implemented in practically any device capable of utilizing solid state memory devices, including other computers and data processing systems, e.g., in single-user computers such as workstations, desktop computers, portable computers, and the like, or in other programmable electronic devices (e.g., incorporating embedded controllers and the like), such as set top boxes, game machines, etc.

Computer 50 generally includes one or more processors 52 coupled to a main storage 54 through one or more levels of cache memory disposed within a cache system 56. In some embodiments each processor 52 may include multiple processing cores. Furthermore, main storage 54 is coupled to a number of types of external devices via a system input/output (I/O) system 58, e.g., one or more networks 60, one or more workstations 62 and one or more mass storage devices 64. Any number of alternate computer architectures may be used in the alternative.

Also shown resident in main storage 54 is a typical software configuration for computer 50, including an operating system 66 (which may include various components such as kernels, device drivers, runtime libraries, etc.) accessible by one or more applications 68.

Computer 50, or any subset of components therein, may also be referred to hereinafter as an "apparatus". It should be recognized that the term "apparatus" may be considered to incorporate various data processing systems such as computers and other electronic devices, as well as various components within such systems, including individual integrated circuit devices or combinations thereof. Moreover, within an apparatus may be incorporated one or more logic circuits that circuit arrangements, typically implemented on one or more integrated circuit devices, and optionally including additional discrete components interfaced therewith.

It should also be recognized that circuit arrangements are typically designed and fabricated at least in part using one or more computer data files, referred to herein as hardware definition programs, that define the layout of the circuit arrangements on integrated circuit devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, Verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy disks, hard disk drives, CD-ROM's, and DVD's, among others, and transmission type media such as digital and analog communications links.

Figure 2:
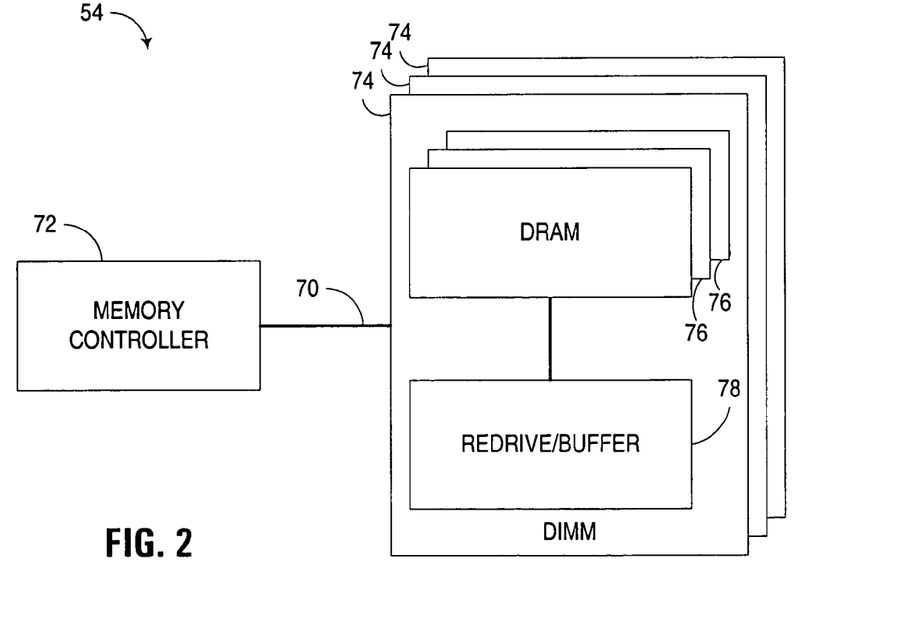
FIG. 2 is a block diagram an exemplary implementation of a main storage memory architecture in the apparatus of FIG. 1.

FIG. 2 next illustrates an exemplary memory architecture for main storage 54, including a memory bus 70 coupling together a memory controller 72 with a plurality of memory modules (e.g., Dual Inline Memory Modules, or DIMM's) 74. Each memory module 74 is typically implemented using a printed circuit board or card upon which is disposed a plurality of dynamic random access memory (DRAM) memory devices 76, and optionally additional interface circuitry, such as a redrive/buffer device 78.

For example, in an SDRAM environment, e.g., a DDR2 SDRAM environment, each memory module may be coupled in parallel to memory bus 70, and may include a redrive device that redrives the address and control lines from memory bus 70 to each memory device, leaving the data lines coupled directly to memory bus 70.

As another example, in a fully buffered DIMM (FB-DIMM) environment, memory modules 74 may be coupled to one another in a daisy chain arrangement, and each memory module may incorporate an Advanced Memory Buffer (AMB) device suitable for redriving the data, address and control lines from the memory bus to each memory device, as well as to drive subsequent FB-DIMM memory modules in the daisy chain arrangement consistent with the FB-DIMM specification.

Memory controller 72 may be a dedicated device, or alternatively, may be incorporated into a composite device, e.g., including one or more embedded caches and/or one or more cache controllers used to drive an external cache. Memory controller 72 may also be combined with other "chipset"-related components, e.g., system I/O components, PCI interface components, etc. Furthermore, memory controller 72 may be embedded in a processor device in some implementations. Furthermore, in some implementations a memory device may be an embedded array that is integrated onto the same integrated circuit as a memory controller, processor or other logic device.

It will be appreciated that practically any memory architecture may be utilized in connection with the invention. Moreover, it will be appreciated that verification operations may be implemented at different levels in a memory hierarchy. As such, the invention is not limited to the particular memory architectures described specifically herein.

Figure 3:
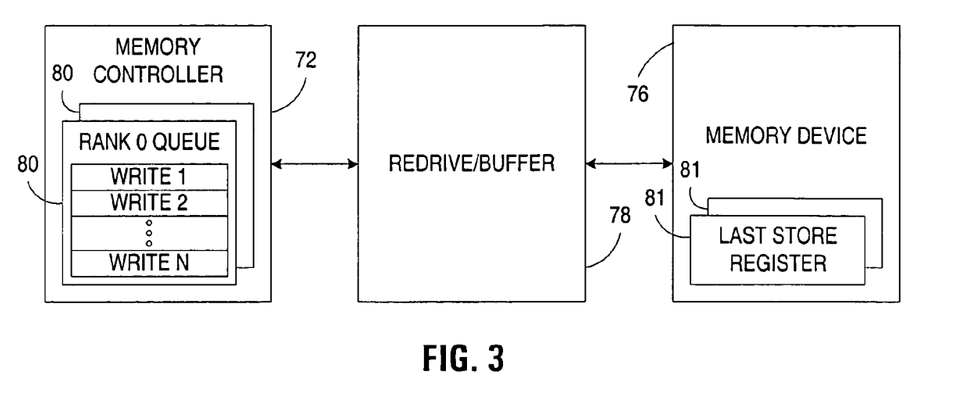
FIG. 3 is a block diagram of one exemplary implementation of the memory architecture of FIG. 2, utilizing a write queue disposed in a memory controller.

Now turning to FIG. 3, a number of exemplary implementations of the herein-described verification operations are illustrated in greater detail. In particular, FIG. 3 illustrates an exemplary implementation of the memory architecture of FIG. 2, showing diagrammatically the interconnection of memory controller 72 with a memory device 76 via an intermediate redrive/buffer device 78. In this implementation, memory controller 72 includes a plurality of queues 80, each allocated to a particular rank, or memory block. In the alternative, each queue 80 may be allocated to a separate memory device, or alternatively, a single queue may be used to handle system-wide operations.

In the illustrated embodiment, each queue 80 includes N entries (e.g., eight) that are configured to store data associated with the last N write operations. In the illustrated embodiment, each entry stores the data intended to be written by the respective write operation. In addition, if it is desirable to support recovery, the address or location associated with a write operation is also maintained in each entry. It will be appreciated, however, that each entry may store other data associated with a write operation consistent with the invention.

In addition, it may be desirable in some embodiments to implement, within each memory device 76, one or more data structures, e.g., last store (LS) registers 81 (each associated with a particular rank) for the purpose of maintaining a copy of the last data written to the memory device. While each register 81 may be specifically architected into the memory device, a preexisting register architected in the memory device may be used to provide this information. In the alternative, a queue similar to queue 80, or another suitable dedicated data structure, may be maintained on each device.

To perform write verification in this implementation, the data maintained in each register 81 may be compared with the intended data for the last store, or write operation, as maintained by an entry in an associated memory controller queue 80. Differences between these values indicate a failed verification, as will become more apparent below.

Figure 4:
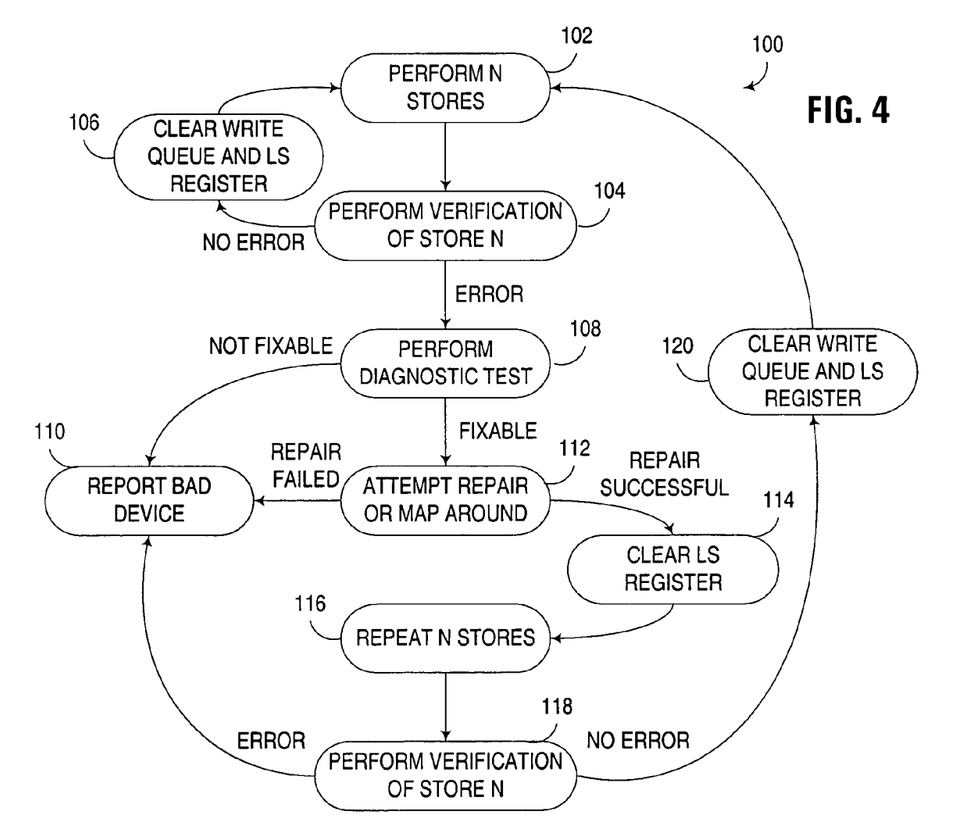
FIG. 4 is a flowchart illustrating an exemplary sequence of steps utilized in performing write verification in the memory architecture of FIG. 3.

In particular, FIG. 4 illustrates at 100 a sequence of operations performed by memory controller 72 in connection with implementing the herein-described verification operations in the embodiment of FIG. 3, and in a manner consistent with the invention.

The sequence of operations illustrated in FIG. 4 is used to handle verification for a single rank or memory block. It will be appreciated that parallel operations may be performed to handle other ranks or memory blocks, or alternatively, a single thread of operation may be used to manage the progress of write operations occurring on multiple ranks or memory blocks.

The sequence begins in block 102 by performing a predetermined number, N, of stores. Thereafter, in block 104, a verification operation is performed for the last store among the plurality of stores (i.e., store N), e.g., by issuing a read operation to retrieve either the data stored at the address associated with store N, or the contents of last store register 81, and comparing the retrieved data to that stored in the queue entry for store N. As another alternative, a write-type operation may be issued to the memory device to forward the data stored in the queue entry for store N, whereby the forwarded data may be compared at the memory device with either the contents of register 81 or the actual data stored in the memory array at the address associated with store N. In this latter alternative, the memory device, upon detecting an error, reports the error back to the memory controller, e.g., via a command or other status signal.

If no error is detected as a result of the verification operation, control passes to block 106 to clear the write queue and the last store register. Control then returns to block 102 to process additional stores.

Returning to block 104, if an error is detected as a result of the verification operation, control passes to block 108 to perform diagnostic testing on the potentially failed device. Any number of diagnostic tests may be performed, including, for example, address integrity checks, command integrity checks, line short tests, line continuity tests, scrub operations, data short tests, data open tests, or practically any other memory testing functionality known in the art.

It may be that as a result of diagnostic testing, it is determined that the error is not fixable. In such an instance, control passes to block 110 to report to the system that the relevant memory device is faulty. Otherwise, if fixable, control passes to block 112 to attempt to repair the memory device, or alternatively, map around the memory device, e.g., through bit steering or use of a spare redundant memory device. Any number of other repair operations may be used as appropriate for the type of error detected, e.g., swapping out redundant lines, time sharing information on other lines, steering, etc.

If the repair operation is not successful, control passes to block 110 to report the faulty memory device. Otherwise, control passes to block 114 to clear the last store register, and then to block 116 to repeat the N stores queued in the write queue, now with the error presumably repaired or otherwise accounted for. Control then passes to block 118 to perform another verification operation in a manner similar to block 104. This time, if an error is detected, control passes to block 110 to report the faulty memory device. Otherwise, if no error is detected, control passes to block 120 to clear the write queue and the last store register, and then to block 102 to process additional stores.

As noted above, it may be desirable to clear the write queue and/or the last store register at a number of points in the sequence of operations illustrated at 100. In the alternative, it may not be necessary to explicitly clear the write queue or the last store register, and just permit new stores to overwrite the data stored in the register and in each queue entry. In such instances, blocks 106, 114 and 120 may be omitted. In addition, it may be desirable to maintain a counter that indicates how many stores are currently queued in the write queue, to determine when a transition should occur from block 102 to block 104.

Figure 5:
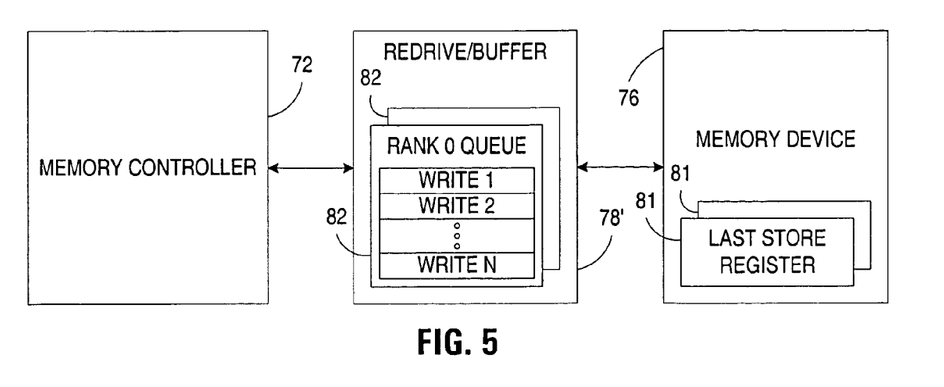
FIG. 5 is a block diagram of an alternate implementation of a memory architecture to that illustrated in FIG. 3, utilizing a write queue disposed in a redrive/buffer device.
Figure 6:
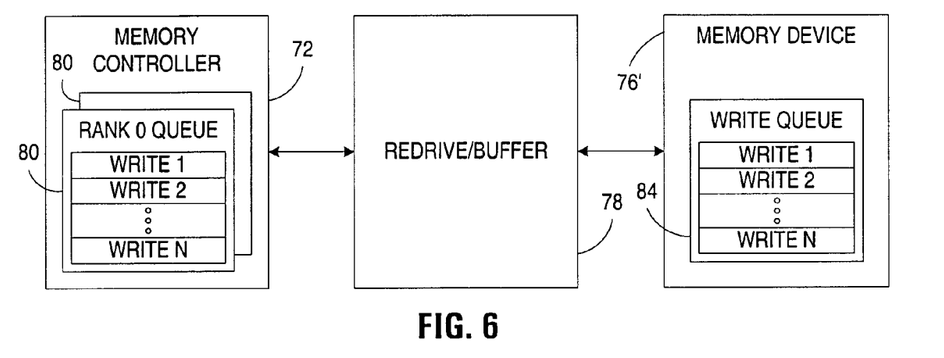
FIG. 6 is a block diagram of another alternate implementation of a memory architecture to that illustrated in FIG. 3, utilizing a write queue disposed in a memory device.

As also noted above, it may be desirable in some implementations to implement the aforementioned functionality, as well as the aforementioned write queues, in other components of a memory architecture. FIG. 5, for example, illustrates an exemplary set of write queues 82 implemented in a redrive/buffer device 78' in lieu of being implemented in the memory controller. Likewise, FIG. 6 illustrates an exemplary write queue 84 implemented in a memory device 76'. In the latter instance, it may be desirable to store, not only store the data to be written, but also the address information, associated with each write operation represented in the queue. In addition, in the latter instance, a more limited set of information may be maintained in the memory controller write queues 80. Further, it will be appreciated that write queues may be maintained in a redrive/buffer device in the embodiment of FIG. 6.

It should also be appreciated that multiple write queues may be used in a given memory device in some implementations, e.g., to handle different banks of memory, different blocks of a memory array, etc. Of note, in the implementations illustrated in FIGS. 5 and 6, similar logic to that described in FIG. 4 may be utilized, but with at least some of the functionality implemented in logic circuitry disposed in one or both of a redrive/buffer device and a memory device.

Figure 7:
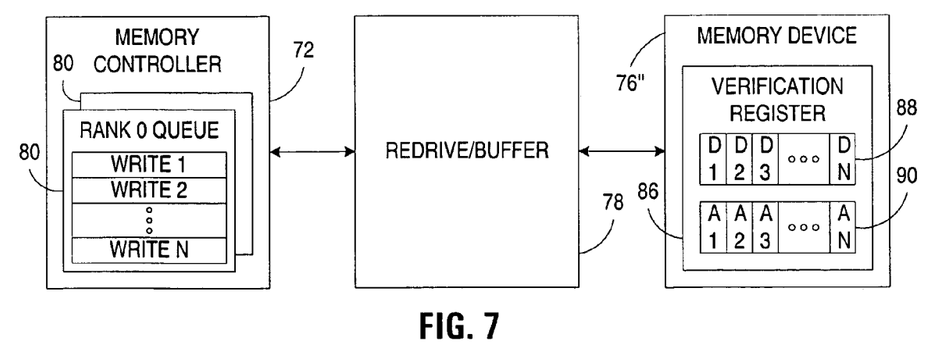
FIG. 7 is a block diagram of yet another alternate implementation of a memory architecture to that illustrated in FIG. 3, utilizing a verification register disposed in a memory device.

FIG. 7 illustrates yet another exemplary implementation, where a memory device 76" includes, in lieu of a write queue data structure, a data structure implemented as a verification register 86 including a data array 88 and an address array 90, each configured to store a subset or hash of data and address information from each of a plurality (N) of stores. Memory controller 72 still includes write queues 80, although alternative data structures may be used to store the complementary information to be compared with the contents of the verification register 86.

A number of different algorithms may be used to hash or stripe data and address information from multiple stores. For example, in an embodiment using x4 SDRAM's having a burst length of 4, and where write verification is performed for every eight stores (i.e., N=8), it may be desirable to store a subset of the write data from each write operation according to the matrix illustrated below in Table I:

TABLE I

|  | DQ0 | DQ1 | DQ2 | DQ3 |
|---|---|---|---|---|
| $T_0$ | $S_0$ | $S_0$ | $S_1$ | $S_1$ |
| $T_1$ | $S_2$ | $S_2$ | $S_3$ | $S_3$ |
| $T_2$ | $S_4$ | $S_4$ | $S_5$ | $S_5$ |
| $T_3$ | $S_6$ | $S_6$ | $S_7$ | $S_7$ | where DQ0-DQ3 are the four data pins on the memory device, $T_0$-$T_3$ are the four transactions in a burst, and $S_0$-$S_7$ are the eight stores or write operations. Thus, for example, the subset of data stored for the first store $S_0$ would be the two bits on pins DQ0 and DQ1 during the first transaction ($T_0$) of the store.

For the address information, and assuming an address width of 64 bits, it may be desirable to store, from each write operation, 8 bits of the write address associated with the operation. For example, it may be desirable to take bits 0-7 of the address from write operation 1, bits 8-15 from write operation 2, etc., with bits 56-63 taken from write operation 8. It will be appreciated that the data and address information stored from each write operation may be taken from the same bit locations in each write operation, or in the alternative, from different bit locations. It will also be appreciated that practically any alternative mapping may be used, and moreover, the bits taken from each write operation need not even be contiguous, nor do the same number of bits need be taken from each write operation.

Figure 8:
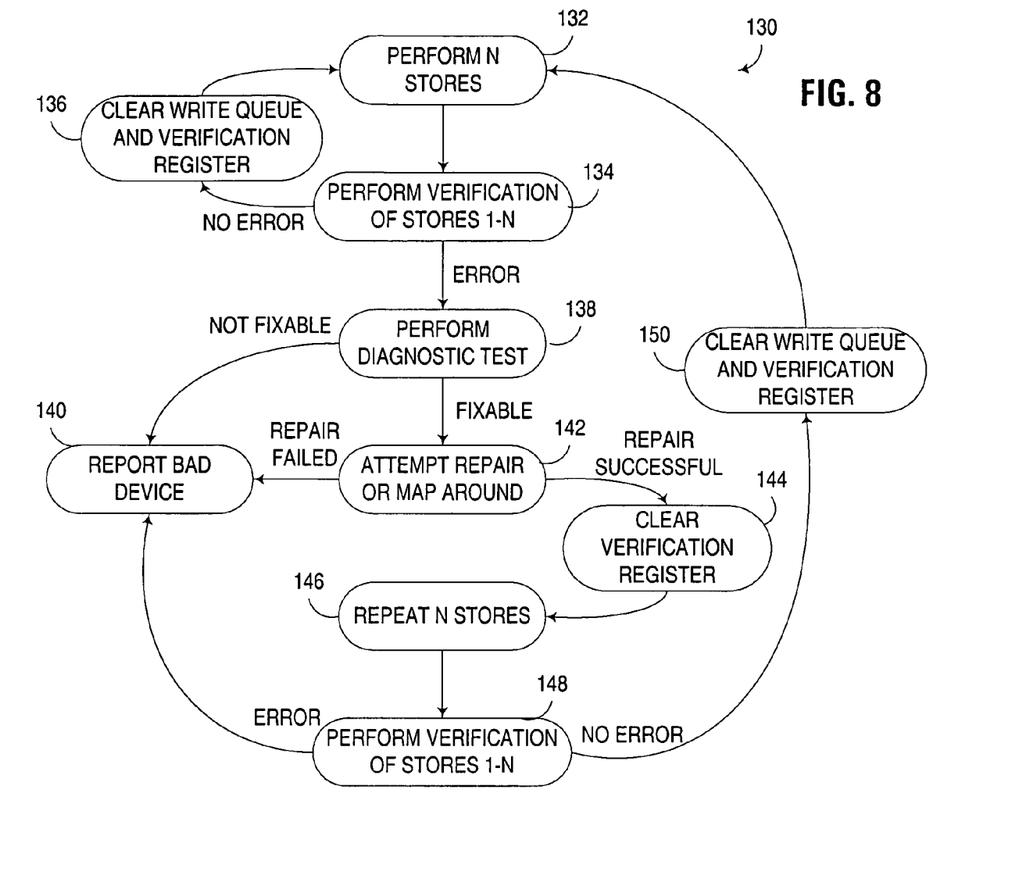
FIG. 8 is a flowchart illustrating an exemplary sequence of steps utilized in performing write verification in the memory architecture of FIG. 7.

FIG. 8 next illustrates at 130 a sequence of operations performed in connection with implementing the herein-described verification operations using the verification registers described above. In this implementation, which operates in much the same manner as the sequence of operations illustrated in FIG. 4, the sequence begins in block 132 by performing a predetermined number, N, of stores. Thereafter, in block 134, a verification operation is performed for stores 1-N.

It will be appreciated that verification in such an implementation may incorporate a read operation that is issued to a memory device to fetch the contents of the verification register from the memory device for comparison at the memory controller, e.g., against data stored in a write queue, or in the alternative, a separate data structure in the memory controller that maintains the same type of information as is maintained by the verification register (typically including information from the verification registers from multiple memory devices). In the alternative, a verification operation may incorporate a write-type operation that forwards comparison data from the memory controller to the memory device for comparison with the contents of the verification register at the memory device, similar to that discussed above in connection with FIG. 4.

If no error is detected as a result of the verification operation, control passes to block 136 to clear the write queue and verification register. Control then returns to block 132 to process additional stores.

Returning to block 134, if an error is detected as a result of the verification operation, control passes to block 138 to perform diagnostic testing on the potentially failed device. If it is determined from the diagnostic testing that the error is not fixable, control passes to block 140 to report to the system that the relevant memory device is faulty. Otherwise, if fixable, control passes to block 142 to attempt to repair the memory device, or alternatively, map around the memory device.

If the repair operation is not successful, control passes to block 140 to report the faulty memory device. Otherwise, control passes to block 144 to clear the verification register, and then to block 146 to repeat the N stores, now with the error presumably repaired or otherwise accounted for. Control then passes to block 148 to perform another verification operation in a manner similar to block 134. This time, if an error is detected, control passes to block 140 to report the faulty memory device. Otherwise, if no error is detected, control passes to block 150 to clear the write queue and verification register. Control then passes to block 132 to process additional stores. Furthermore, as discussed above in connection with FIG. 4, it may not be necessary to clear the write queues and/or the verification register in some embodiments, whereby blocks 136, 144 and 150 may be omitted in some embodiments.

Figure 9:
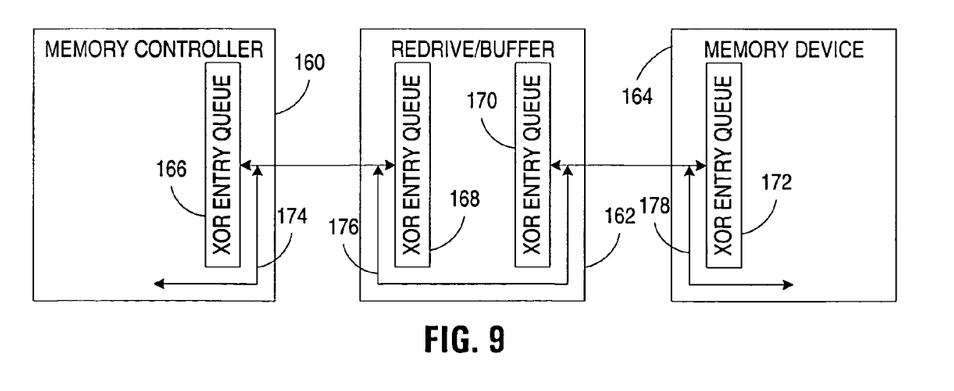
FIG. 9 is a block diagram of another alternate implementation of a memory architecture to that illustrated in FIG. 3, utilizing XOR entry queues disposed in each of a memory controller, a redrive/buffer device and a memory device.

Turning to FIG. 9, in yet another alternative embodiment, data structures referred to herein as entry queues may be utilized on interconnected components in a memory architecture, shown for illustrative purposes including a memory controller 160, a redrive/buffer device 162 and a memory device 164, to assist in isolating the location of a defect in the memory architecture. For example, entry queues implemented as XOR registers may be utilized at each component boundary, as illustrated at 166, 168, 170 and 172. In the alternative, entry queues may be disposed proximate other intermediate locations in a memory architecture, e.g., at a dataflow chip, a first latch of a memory storage device, or other points not necessarily on a chip or component boundary. It will also be appreciated that it may also be desirable to maintain a write queue or similar data structure in memory controller 160 or another component to queue the last N stores and assist in recovering from an error detected via a verification operation.

Each entry queue 166-172 may be used to save the store data for a given write operation (e.g., one cache line of data), which may be read back at a later time to determine if an earlier store had the data transferred to the intermediate location. The data saved at these intermediate locations may then be XOR'ed with any number of following write operations. Furthermore, the individual transfers within a single burst operation may be XOR'ed together in some embodiments.

It will also be appreciated that ECC (if used) will continue to be valid in the intermediate store location(s) as long as each transfer to these intermediate store location(s) have valid ECC. Thus, by reading the accumulated XOR'ed data within a valid ECC Word and seeing valid ECC, it can be assured that all of the previous N write transfers to the intermediate location were correct. As can be seen at 174, 176 and 178 in FIG. 9, the normal read/write path is shown going around this register as it is typically desirable to locate the entry queues outside of the normal read/write data path. The queues are typically only updated with store data being sent out to memory, and a read of the accumulated XOR'ed data after every store or every Nth store resulting in invalid ECC will indicate a store fail somewhere in the previous N transfers, so error recovery can be initiated. When an ECC error is detected, it should also be possible to match an exact signature on each individual data bit, and thus permit failures to be isolated at any level of the interface.

It will be appreciated that the odds are typically only 50/50 that an individual bit will be detected as incorrect if it has experienced multiple failures; however, this would still give very useful data in attempting to analyze failures that encompass a large number of bits on an interface (i.e., 50% of them would show up bad typically). Subsequent single operations may be used in some embodiments to deterministically find all bad bits or connections (e.g., using test patterns with XOR operations to find any faults). Furthermore, to avoid any confusion associated with correctable ECC errors, XOR data can use ECC corrected data at each level of the hierarchy where all data and ECC bits pass through the same device. At lower levels where this is not the case, only raw XOR data may be used.

Also, in some embodiments, a bypass approach, where a unique command is used to fetch XOR data from any part of the system, may be used. In such an embodiment, the XOR data fetched from one part of the system is desirably not combined with the XOR data of any intermediate components (e.g., repower or redrive chips) on the way to the memory controller, so that the exact location and extent of failure may be determined.

It will also be appreciated that, in lieu of XOR operations, other algorithms or mathematical operations may be performed to accumulate the information associated with multiple write operations. This embodiment of the invention is therefore not limited to XOR-based accumulation.

Figure 10:
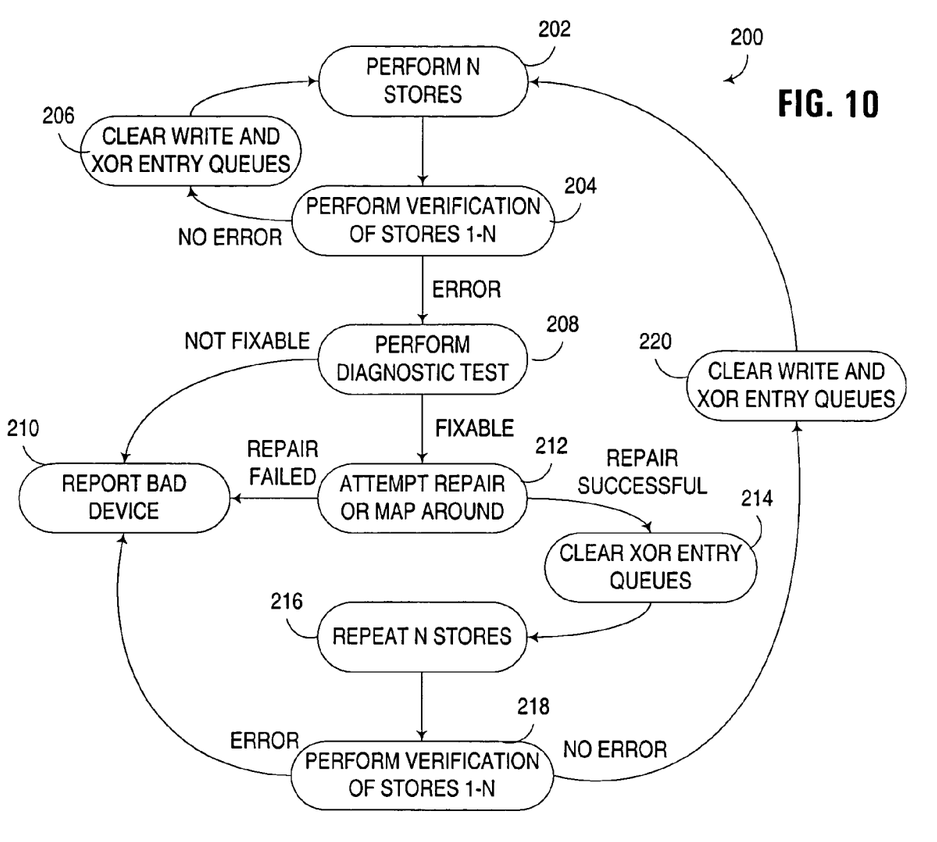
FIG. 10 is a flowchart illustrating an exemplary sequence of steps utilized in performing write verification in the memory architecture of FIG. 9.

FIG. 10 illustrates at 200 a sequence of operations that may be performed in connection with implementing the herein-described verification operations using the XOR entry queues described above. In this implementation, which operates in much the same manner as the sequence of operations illustrated in FIG. 8, the sequence begins in block 202 by performing a predetermined number, N, of stores. Thereafter, in block 204, a verification operation is performed for stores 1-N. It will be appreciated that verification in such an implementation may incorporate reading remote XOR data from a memory device or other downstream component and comparing at a memory controller or other upstream component, or alternatively sending XOR data from a memory controller or other upstream component to a memory device or other remote downstream component and performing the comparison in the remote component, similar in many respects to the verifications performed in the embodiments of FIGS. 4 and 8.

If no error is detected as a result of the verification operation, control passes to block 206 to clear the write and XOR entry queues. Control then returns to block 202 to process additional stores.

Returning to block 204, if an error is detected as a result of the verification operation, control passes to block 208 to perform diagnostic testing on the potentially failed device. If it is determined from the diagnostic testing that the error is not fixable, control passes to block 210 to report to the system that the relevant memory device is faulty. Otherwise, if fixable, control passes to block 212 to attempt to repair the memory device, or alternatively, map around the memory device.

If the repair operation is not successful, control passes to block 210 to report the faulty memory device. Otherwise, control passes to block 214 to clear the XOR entry queues, and then to block 216 to repeat the N stores, now with the error presumably repaired or otherwise accounted for. Control then passes to block 218 to perform another verification operation in a manner similar to block 204. This time, if an error is detected, control passes to block 210 to report the faulty memory device. Otherwise, if no error is detected, control passes to block 220 to clear the write and XOR entry queues. Control then passes to block 202 to process additional stores. Furthermore, as with the verification registers, it may not be necessary to clear the write queue and/or XOR entry queues in some embodiments, whereby blocks 206, 214 and 220 may be omitted.

It will be appreciated that various additional modifications may be made to the illustrated embodiments consistent with the invention. It will also be appreciated that implementation of the functionality described above, and in particular, of the specific sequences of operations illustrated in FIGS. 4, 8 and 10, within logic circuitry disposed on a memory device, a memory controller, and/or other control logic in a memory architecture, would be well within the abilities of one of ordinary skill in the art having the benefit of the instant disclosure.

What is claimed is:

1. A method of verifying storage of data in a solid state memory storage device, the method comprising:

issuing a plurality of write operations to the solid state memory storage device, wherein each write operation is configured to initiate storage of data associated therewith in the solid state memory storage device, wherein the number of write operations of the plurality of write operations is N;

preserving data associated with each write operation among the plurality of write operations in a queue, including preserving for each write operation a write address for such write operation and at least a portion of the data to be stored in the solid state memory storage device by such write operation as each such write operation is issued;

initiating a verification operation after issuance of the N number of write operations, including comparing the preserved data for a last-issued write operation among the N write operations with data stored in the solid state memory storage device for the last-issued write operation, wherein the verification operation is configured to verify only a subset of the data written to the solid state memory storage device by the plurality of write operations;

upon detection of an incorrect storage of data in the solid state memory storage device with the verification operation, using the preserved data from the queue to recover from the incorrect storage of data in the solid state memory storage device, wherein using preserved data includes using the write address and the at least a portion of the data to be stored for at least one write operation other than the last write operation to recover from the incorrect storage of data;

discarding the preserved data upon the verification operation failing to detect incorrect storage of data in the solid state memory storage device; and periodically issuing a verification operation after issuance of every N write operations, wherein N is a natural number greater than 1 and is equal to a total number of entries of the queue.

2. The method of claim 1, wherein preserving the data associated with each write operation includes storing the data to be written to the solid state memory storage device by each write operation in a queue.

3. The method of claim 1, wherein initiating the verification operation comprises:

retrieving data located at a memory address identified by the last-issued write operation among the plurality of write operations; and comparing the retrieved data with the data intended to be written to the solid state memory storage device by the last-issued write operation.

4. The method of claim 1, further comprising preserving a subset of the data associated with each write operation among the plurality of write operations in a register such that the register stores data associated with each of the plurality of write operations, wherein initiating the verification operation comprises retrieving data from a memory device and comparing the data to the data stored in the register.

5. The method of claim 4, wherein preserving the subset of the data associated with each write operation includes hashing the data associated with the plurality of write operations.

6. The method of claim 4, wherein preserving the subset of the data associated with each write operation includes accumulating data associated with each write operation according to a mathematical operation.

7. The method of claim 6, wherein the mathematical operation is an exclusive-OR operation.

8. The method of claim 1, further comprising preserving data associated with each write operation at an intermediate location in a memory architecture to assist in isolating a location of a defect.

9. The method of claim 8, wherein preserving data associated with each write operation at the intermediate location includes preserving data associated with each write operation in an entry queue disposed proximate the intermediate location.

10. The method of claim 9, wherein preserving data in the entry queue comprises accumulating data associated with each write operation according to a mathematical operation.

11. The method of claim 10, wherein the mathematical operation is an exclusive-OR operation.

12. The method of claim 9, further comprising preserving data associated with each write operation in a second entry queue disposed proximate a second intermediate location, wherein initiating the verification operation includes comparing data stored in the first entry queue to data stored in the second entry queue.

13. The method of claim 8, wherein the intermediate location is disposed in one of a memory controller, a memory device, and a component disposed intermediate the memory controller and the memory device.

* * * * *